Patented Nov. 13, 1928.

1,691,274

UNITED STATES PATENT OFFICE.

HENNING GUSTAV FLODIN, OF ROSLAGS-NASBY, AND EMIL GUSTAF TORVALD GUSTAFSSON, OF STOCKHOLM, SWEDEN, ASSIGNORS TO HAMPUS GUSTAF EMRIK CORNELIUS, OF STOCKHOLM, SWEDEN.

METHOD OF PRODUCING DENSE IRON AND IRON ALLOYS DIRECTLY OUT OF OXIDE ORES.

No Drawing. Application filed June 22, 1925, Serial No. 38,941, and in Sweden May 26, 1925.

The present invention refers to a method of producing iron, steel and iron alloys having a low percentage of oxygen and gas, directly out of their oxide ores, that is a dense iron with a low percentage of oxygen and a low percentage of gases such as $CO$, $CO_2$, $H$ and $N$.

The invention relates especially to the production of low carbon iron, steel and iron alloys having such a low percentage of oxygen and gas and consists essentially of the novel steps employed hereinafter set forth in detail and particularly pointed out in the claims.

The process is carried out by first mixing intimately oxide iron ore containing oxide of a metal capable of deoxidizing and degasifying iron, as for instance vanadium or titanium or both, together with carbonaceous material. Oxide iron ore or ores not containing such metal, for instance common oxide ore, may be added to the mixture, and the carbonaceous material may be partly replaced by other reducing agent. The quantity of the reducing agent is so proportioned as to obtain in the process a malleable product, that is the reducing agent is to be used only in the quantity required for the reduction of the metal oxides and for the low carbon content in the product, if any. All the ingredients in the mixture should be used in a finely divided state. The mixture is then transformed, if necessary with the use of a suitable binding agent, and, preferably, in connection with a drying or hardening process, into briquettes or pieces or lumps of some other shape so as to effect fixing of the mutual positions of the particles of the reducing agent and the ore grains. Then the mixture thus solidified is fed into an electric furnace successively, for instance more or less continuously, and reduced and melted in said furnace whilst floating on top of a slag bath in same giving on the bottom of the furnace an iron, steel or iron alloy having a low carbon content and a low percentage of oxygen and gases.

The dense nature of the product is obtained owing to the fact that a greater or smaller portion of the metal capable of deoxidizing and degasifying iron is reduced out from its oxide simultaneously and together with the iron contained in the charge and with any alloying metals, small drops of iron being formed which contain a greater or smaller percentage of the metal having the property of absorbing oxygen and gas. The action of the degasifying and deoxidizing metal on the iron takes place in the moment of formation of both metal and iron, i. e. in statu nascendi, whereby the action of the metal will be the most effective. On the iron drops sinking through the slag bath, the said metal may wholly or partly be oxidized and pass from the iron into the slag, but nevertheless the iron drops have, owing to the presence of this metal, and quite in spite of the short duration of the period in which the metals are present, become purified from oxygen and gases in a degree which is not inconsiderably greater than if the said metals had not been present in the charge at all. Even if in the ready iron or iron alloy the presence of the metal cannot be proved, or the metal can be shown to be present only in very small quantities, for instance, when a strong basic slag is used, the iron or iron alloy obtained is, nevertheless, of a very high quality as regards the absence of oxygen and gas.

Inasmuch as the oxides of the metals which may be considered for the purpose, above all, titanium and vanadium, are to be regarded as acids, the greatest reduction of these metals, and thus the greatest percentage of the same in the final product will be obtained if the slag formed in the melting process is kept acid, because a basic slag will readily absorb the acid metal oxides, either directly or indirectly. Thus, if the composition of the charge per se is not such that an acid slag is obtained in the melting process, substances rendering the slag acid, such as quartz or sand, should, if otherwise the desired quality of the iron or the alloy permits the use of an acid slag, be added to the charge when the latter is prepared, or, such substances should be introduced into the furnace directly during the melting process.

If the ore contained in the charge contains titanium in a considerable quantity, an iron or an iron alloy with a satisfactorily low percentage of sulphur is obtained even with a relatively great percentage of sulphur in the charge. If, on the other hand, the percentage of phosphorus or sulphur is high in the charge, for example, through a phosphorous ore or a reducing agent rich in sulphur, the percentage of phosphorus or sulphur in the metal reduced may become too high to permit direct employment of the metal. The metal may then be dephosphorized or desulphurized in known manner in the reduction furnace or in some other furnace by treatment with a dephosphorizing or a desulphurizing basic slag. The metals absorbed which act to bind the oxygen and the gases will then, for the most part, or, entirely, be driven out from the metal and taken up by the slag, it is true, but still the final metal obtained is of a high quality with respect to the percentage of oxygen and gases.

If the iron reduced contains vanadium to any appreciable extent according to the present invention, in separating the iron from the slag formed during the smelting process and treating the iron with an oxidizing slag, which is common practice in dephosphorizing, the vanadium will be almost entirely transferred into the slag. Even when desulphurization alone is effected, a greater or smaller portion of the said metal may be absorbed in the slag formed. As the amount of oxidizing slag may be kept comparatively small, the percentage of vanadium in the slag will be rather high, particularly in the slag first formed, which contains practically all of the vanadium but only a comparatively small quantity of phosphorus. This slag may thus be utilized to recover vanadium compounds or vanadium in known manner. As a material, which is rich in vanadium acid, is sold at a very high price, a considerable portion of the costs for the iron or iron alloy produced may be covered in this manner, if an ore containing vanadium forms a portion of the charge.

With the use of a slag which is rich in phosphorus or sulphur, melting may evidently be effected with a basic slag absorbing phosphorus or sulphur, and still an iron or iron alloy having a low percentage of oxygen and gas may be obtained. If the composition of the charge is not such as to give a suitable basic slag in the melting process, suitable substances such as lime, dolomite, fluorspar or the like may either be added to the same, or be introduced directly into the furnace. If the contents of phosphorus or sulphur in the charge is high, special dephosphorization or desulphurization may be necessary in this case, too.

Obviously, the method in question is suitable also for the production of iron or iron alloys which, in addition to having a low percentage of oxygen and gas, also contain the desired percentage of any other metal or metals having the property of deoxidizing and degasifying iron, that is of decreasing the percentage of oxygen and gases in iron, such metals being, for instance, titanium and vanadium. In such a case melting with an acid slag is to be preferred. Of the ore containing vanadium or titanium or both, which ore is in most cases constituted by an iron ore, such quantity is then admixed to the charge, together with the requisite reducing agent therefor, which on reduction and melting yields the desired percentage of the said metal or metals in the product.

If the iron reduced, which contains vanadium or titanium or both, needs to be dephosphorized or desulphurized, or if, for instance, the percentage of vanadium therein is higher than required, it is preferable, prior to the dephosphorization or the desulphurization or prior to the tapping into moulds, to treat the metal in the same or in some other electric furnace with a small quantity of oxidizing slag, in which then the major portion of the vanadium percentage of the metal is absorbed. If this slag is kept acid, and if the treatment is effected in a furnace with an acid lining, the slag will absorb only an inconsiderable amount of the phosphorus and sulphur contaminations. The percentage of vanadium, on the other hand, will be high and, therefore, the slag may then be readily worked to recover vanadium also in the metallurgical way. After the metal has been purified from phosphorus or sulphur, it is easy, on the metal having been separated from the refining slag, again to introduce the vanadium into the metal, by reducing the same, wholly or partly, out of the recovered slag which is rich in vanadium, in an electric furnace adapted for the purpose. This reduction may, for example, take place by adding to the liquid vanadium-containing slag on top of the metal, carbon or some other reducing agent, such as ferro-silicon, ferro-aluminium-silicon, aluminum or the like, which reduces a greater or smaller portion of the vanadium in the slag. A more complete reduction of the vanadium out of the slag is obtained if the finely powdered slag is mixed with the said finely divided reducing agent and the mixture is transformed into form of briquettes or other pieces, after which the briquettes or lumps are reduced and melted on a thin slag bath on top of the metal. Preferably, this slag bath may then consist of slag of the said kind which is rich in vanadium.

In the following an illustrative example will be given of the manner in which the invention may be practiced for producing dense low carbon iron and steel.

Briquettes were prepared from a mixture of the following composition:

|  | Parts by weight |
|---|---|
| Titaniferous iron ore with 48.5% Fe and 10.9% $TiO_2$ | 100 |
| Charcoal with 79.5% C | 16.4 |
| Burnt lime used as lime white | 20 |

The smeltings were carried out in an electric furnace provided with three vertical electrodes adapted to be raised and lowered and with two lateral feeding stacks each having a screw conveyor for introduction of the charge. Briquettes of the above composition were fed into the furnace practically continuously and reduced and melted therein whilst floating in a thin layer on top of the slag bath. During the smeltings further quantities of burnt lime were introduced into the furnace in order to keep a suitable basicity of the slag. The voltage used was so adapted as to obtain an arc of suitable length between each of the electrodes and the slag bath, so that, consequently, the heat necessary for the process was developed by arcs as well as by electric resistance in the slag.

The smelting proceeded very evenly and quietly, and the steel obtained was of extraordinarily high quality, especially regarding the freedom from gas and oxygen, in spite of the ore used being of very low grade, containing for instance 1.11% of sulphur. A typical analysis of the steel showed the following figures:

$$C = 0.75\%.$$
$$Ti = 0.09\%.$$
$$V = \text{trace}.$$
$$P = 0.020\%.$$
$$S = 0.014\%.$$

As shown the percentage of titanium was as low as 0.09% and vanadium only traceable, but nevertheless the steel was very dense, being practically free from gas and oxygen. Other steels contained only trace of titanium, were, however, of the same high quality regarding freedom from gas and oxygen. Consequently, the theory according to which the deoxidizing and degasifying metals need not be left in the final product and yet the product be dense is verified in practical working.

Other smeltings were carried out with approximately the same result regarding the quality of the products, wherein in the briquettes part of the titaniferous iron ore above mentioned was replaced by plain iron ore concentrate with 64% Fe. Thereby the yield of iron or steel from the briquettes became higher and thus the process more economical.

In all smeltings above referred to the slag was held strongly basic. Other smeltings were carried out containing about 0.75% $V_2O_5$, a steel was obtained with acid slag, in which from, for instance, an iron ore containing 0.1 to 0.2% vanadium.

According to the present method, the great deposits of ores containing titanium may be developed with the greatest advantage. For the common metallurgical process these ores are not desirable owing to the large amount of coal required and the difficulty of reducing them, but in a method like the present one, where the ore is to be finely crushed and is reduced substantially with solid carbon, these ores may be recovered with the same advantage as other ores. The drawback of the ores is the comparatively low percentage of iron and the large percentage of gangue, but as the ore will have to be crushed at any rate, it is, otherwise, very easy to obviate this drawback by concentration according to known methods. Moreover, the ore containing titanium very often holds vanadium and, therefore, out of such an ore alone or admixed with some other iron ore, if the present method is used, an excellent iron with respect to its low contents of gas and oxygen can be produced directly. On account of the reduction of the oxide of vanadium or titanium or both the iron or the iron alloy attains, provided the amount of ore containing vanadium and titanium is sufficient, the qualitative properties characteristic of dense iron.

The smaller the size of the grains of the ore and particles of the reducing carbon that is to say the more the size of the grains approaches the molecular size, the better the reduction is effected. The size of the grains of the ore and preferably also of those of the reducing agent should be such that 75% at least of the grains will pass through a sieve having 200 meshes per square centimeter.

The invention is independent of the manner in which the charge is solidified. For instance, this may be effected not only by transforming the mixture into larger or smaller pieces or lumps by a briquetting process or the like, but also by nodulizing the mixture.

The invention is not limited to the metals or ores containing such metals, nor to the admixtures hereinbefore mentioned by way of example only, but comprises all production of iron and iron alloys having a low percentage of oxygen or gases or both and coming in the form of ingot metal with the use of the method set forth.

What we claim as new and desire to secure by Letters Patent of the United States of America is:—

1. A direct electric reduction process for producing dense iron or iron alloys from oxide iron ore containing a metal capable of deoxidizing and degasifying iron, with a charge composed of such ore in a finely divided state and carbonaceous material, mixed and solidified, feeding said charge successively into an electric furnace and smelting same whilst floating on top of a slag bath in said furnace, separating iron and slag, forming on the iron an oxidizing slag, removing said slag containing the main part of the said metal, refining the reduced iron or iron alloy, slagging off, reducing the slag from the oxidizing period in the presence of the refined iron or iron alloy in an electric furnace and tapping the iron alloyed with said metal.

2. A direct electric reduction process for producing dense iron or iron alloys from oxide iron ore containing vanadium, with a charge of such ore in a finely divided state, other oxide iron ore in a finely divided state, carbonaceous material and material capable of making the slag formed during reduction acid, mixed and solidified, feeding said charge successively into an electric furnace and smelting same whilst floating on top of a slag bath in said furnace, separating iron and slag, forming on the iron an oxidizing and slag, removing said slag which contains the main part of the vanadium, refining the reduced iron or iron alloy, slagging off, reducing the slag from the oxidizing period in the presence of the refined iron or iron alloy in an electric furnace and tapping the iron alloyed with vanadium.

3. An electric reduction process for producing dense iron or iron alloys from oxide iron ore containing a metal capable of deoxidizing and degasifying iron, with a charge composed of such ore in a finely divided state and carbonaceous material, mixed and solidified, feeding said charge successively into an electric furnace and smelting same whilst floating on top of a slag bath in said furnace, separating iron and slag, forming on the iron an oxidizing slag, removing said slag containing the main part of the said metal, refining the reduced iron or iron alloy, slagging off, reducing a charge composed of the slag from the oxidizing period in a finely divided state and a reducing agent, mixed and solidified, in the presence of the refined iron or iron alloy, and tapping the iron alloyed with said metal.

4. A direct electric reduction process for producing dense iron, steel and iron alloys, which comprises mixing intimately oxide iron ore containing a metal capable of deoxidizing and degasifying iron, together with carbonaceous material, both ingredients in a finely divided state, solidifying the mixture, feeding said solidified mixture successively into an electric furnace, reducing and melting the mixture in said electric furnace whilst floating on top of a slag bath in same, and proportioning the quantity of carbonaceous material in the mixture to obtain a malleable product.

5. A direct electric reduction process for producing dense iron, steel and iron alloys, which comprises mixing intimately oxide iron ores one of which contains a metal capable of deoxidizing and degasifying iron, together with carbonaceous material, all ingredients in a finely divided state, solidifying the mixture, feeding said solidified mixture successively into an electric furnace, reducing and melting the mixture in said electric furnace whilst floating on top of a slag bath in same and proportioning the quantity of carbonaceous material in the mixture to obtain a malleable product.

6. A direct electric reduction process for producing dense iron, steel and iron alloys, which comprises mixing intimately titaniferous oxide iron ore together with carbonaceous material, both ingredients in a finely divided state, so proportioning the quantity of carbonaceous material in the mixture as to obtain a malleable product, solidifying the mixture, feeding said solidified mixture successively into an electric furnace, and reducing and melting the mixture in said furnace whilst floating on top of a slag bath in same.

7. A direct electric reduction process for producing dense iron, steel and iron alloys, which comprises mixing intimately oxide iron ore containing oxides of vanadium and titanium together with carbonaceous material, both ingredients in a finely divided state, so proportioning the quantity of carbonaceous material in the mixture as to obtain a malleable product, solidifying the mixture, feeding said solidified mixture successively into an electric furnace, and reducing and melting the mixture in said furnace whilst floating on top of a slag bath in same.

8. A direct electric reduction process for producing dense iron, steel and iron alloys, which comprises mixing intimately oxide iron ore containing oxide of a metal capable of deoxidizing and degasifying iron, together with reducing agent including carbonaceous material, both ingredients in a finely divided state, so proportioning the quantity of reducing agent in the mixture as to obtain a malleable product, solidifying the mixture, feeding said solidified mixture successively into an electric furnace, and reducing and melting the mixture in said furnace whilst floating on top of a slag bath in same.

9. A direct electric reduction process for producing dense iron, steel and iron alloys, which comprises mixing intimately oxide iron ores one of which contains oxide of a metal capable of deoxidizing and degasifying iron, together with carbonaceous material, all ingredients being in a finely divided state, solidifying the mixture, feeding said solidified mixture successively into an electric furnace, reducing and melting the mixture in said furnace whilst floating on top of a slag bath in same, the quantity of carbonaceous material in the charge as well as the quantity of the ore containing said metal being proportioned so as to obtain a product, which is dense and malleable, and contains a low desired percentage of said metal.

10. A direct electric reduction process for producing dense iron, steel and iron alloys, which comprises mixing intimately oxide iron ore containing oxide of a metal capable of deoxidizing and degasifying iron, together with carbonaceous material and a substance capable of making the slag formed during reduction acid, all ingredients being in a finely divided state, so proportioning the quantity of carbonaceous material in the mixture as to obtain a malleable product, solidifying the mixture, feeding said solidified mixture successively into an electric furnace, and reducing and melting the mixture in said furnace whilst floating on top of a slag bath in same.

11. A direct electric reduction process for producing dense iron, steel and iron alloys, which comprises mixing intimately oxide iron ore containing oxide of a metal capable of deoxidizing and degasifying iron, together with carbonaceous material, both ingredients being in a finely divided state, so proportioning the quantity of carbonaceous material in the mixture as to obtain a malleable product, solidifying the mixture, feeding said solidified mixture successively into an electric furnace, reducing and melting the mixture in said furnace whilst floating on top of an acid slag bath in same, separating the slag from the product formed, which latter contains part of said deoxidizing and degasifying metal, treating the product with a small quantity of an oxidizing slag, removing said latter slag containing the main part of the quantity of said metal previously contained in the product, and refining the product thus treated.

In testimony whereof we affix our signatures.

HENNING GUSTAV FLODIN.
EMIL GUSTAF TORVALD GUSTAFSSON.